(12) United States Patent
Duddey

(10) Patent No.: US 6,467,520 B2
(45) Date of Patent: Oct. 22, 2002

(54) TIRE WITH APEX RUBBER CONTAINING IN-SITU RESIN

(75) Inventor: James Edward Duddey, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/739,987

(22) Filed: Dec. 19, 2000

(65) Prior Publication Data

US 2002/0124927 A1 Sep. 12, 2002

(51) Int. Cl.$^7$ .......................... B60C 1/00; B60C 15/06; C08L 21/00
(52) U.S. Cl. .................. 152/450; 152/541; 525/159
(58) Field of Search .................. 152/541, 450; 525/159

(56) References Cited

U.S. PATENT DOCUMENTS

| | | | |
|---|---|---|---|
| 3,408,308 A | 10/1968 | Waterman et al. | 252/401 |
| 3,477,451 A | 11/1969 | Majewski | 134/22 |
| 3,534,119 A | 10/1970 | Relyea | |
| 3,535,277 A | 10/1970 | Miller et al. | |
| 3,553,163 A | 1/1971 | Spacht et al. | |
| 3,704,274 A | 11/1972 | Callan | |
| 3,790,647 A | 2/1974 | Kiss et al. | |
| 3,851,012 A | 11/1974 | Wertz et al. | |
| 3,897,583 A | 7/1975 | Bellamy | 428/256 |
| 3,900,999 A | 8/1975 | Callan | 52/744 |
| 4,072,650 A | 2/1978 | Littlefield | |
| 4,342,852 A | 8/1982 | Takeda et al. | 525/481 |
| 4,395,498 A | 7/1983 | Beaham | 523/158 |
| 4,539,365 A | 9/1985 | Rhee | 524/495 |
| 4,731,430 A | 3/1988 | Kempter et al. | 528/139 |
| 4,889,891 A | 12/1989 | Durairaj et al. | 525/139 |
| 4,950,810 A | 8/1990 | Kinishi et al. | 568/790 |
| 5,021,522 A | 6/1991 | Durairaj et al. | 525/502 |
| 5,030,692 A | 7/1991 | Durairaj | 525/134 |
| 5,164,435 A | 11/1992 | Abe et al. | 524/100 |
| 5,266,620 A | 11/1993 | Shinoda et al. | 524/495 |
| 5,618,984 A | 4/1997 | Kawabata et al. | 569/720 |
| 6,223,797 B1 * | 5/2001 | Shida et al. | 152/532 |
| 6,269,858 B1 * | 8/2001 | Sandstrom | 152/547 |

FOREIGN PATENT DOCUMENTS

| | | |
|---|---|---|
| CA | 956394 | 10/1974 |
| DE | 247016 | 6/1987 |
| EP | 697432 | 8/1995 |
| EP | 1075966 | 2/2001 |
| FR | 1508143 | 9/1966 |
| GB | 1102216 | 11/1966 |
| GB | 1142988 | 1/1968 |
| GB | 1323507 | 7/1973 |
| GB | 1435122 | 5/1976 |
| JP | 52135346 | 5/1976 |
| JP | 57131223 | 2/1981 |
| JP | 57137330 | 2/1981 |
| JP | 57137331 | 2/1981 |
| JP | 57137333 | 2/1981 |
| JP | 61051041 | 8/1984 |
| JP | 61174245 | 1/1985 |
| JP | 1065150 | 9/1987 |
| JP | 63191854 | 8/1988 |
| JP | 2160867 | 12/1988 |
| JP | 6200078 | 12/1992 |
| JP | 8109233 | 4/1996 |
| JP | 10017721 | 7/1996 |
| JP | 10017722 | 7/1996 |
| JP | 11172041 | 12/1997 |
| NL | 6610966 | 2/1967 |
| NL | 7700449 | 7/1977 |

OTHER PUBLICATIONS

Cardolite NC–360 specification relating to cashew nutshell liquid polymer, dated Dec. 11, 1995.
Material Safety Data Sheet for NC–360 Cardolite Brand Resin.
Abstract of Russian Patent No. 771122, granted Oct. 15, 1980 (Caplus).
Abstract of Russian Patent No. 761500, granted Sep. 7, 1980 (Caplus).
Abstract of South African Patent No. 6800398, granted Jul. 18, 1968 (Caplus).
Abstract of South African Patent No. 6704923, granted Jan. 23, 1968 (Caplus).
Abstract of Japanese Patent No. 3247643, granted Feb. 26, 1990 (Caplus).
"Identification of Tackifying Resins and Reinforcing Resins in Cured Rubber", by S. W. Kim, G. H. Lee and G. S. Heo; *Rubber Chemistry and Technology*, vol. 72, pp. 181 through 198.

* cited by examiner

*Primary Examiner*—Jeffrey Mullis
(74) *Attorney, Agent, or Firm*—Bruce J. Hendricks; John D. DeLong

(57) ABSTRACT

A pneumatic tire having the apex area around the carcass ply turnup comprised of a rubber having 2.2 to 25 phr of the reaction product of a partially polymerized cashew nutshell oil resin and a methylene donor.

5 Claims, 1 Drawing Sheet

TIRE WITH APEX RUBBER CONTAINING IN-SITU RESIN

FIELD OF THE INVENTION

This invention relates to a pneumatic tire having an apex in the region of the carcass ply turnup. More specifically, the invention relates to a pneumatic tire having an apex comprised of a rubber containing the reaction product of a partially polymerized cashew nutshell oil resin and a methylene donor.

BACKGROUND OF THE INVENTION

The term "apex" as used herein refers to the area of the tire in the immediate proximity of the carcass ply turnup. The apex includes a rubber wedge located in the lower sidewall region above the bead and is bonded to and encased by the carcass plies. The apex also includes the area located between the lower sidewall rubber and the axially outer side of the carcass ply turnup.

A tire is a composite of several components each serving a specific and unique function yet all synergistically functioning to produce the desired performance. One important component is the carcass ply. The carcass ply is a continuous layer of rubber-coated parallel cords which extends from bead to bead and functions as a reinforcing element of the tire. The plies are turned up around the bead, thereby locking the bead into the assembly or carcass. The tire is assembled in the green (uncured) state and upon completion is then vulcanized. Conventional resorcinol-methylene donor systems are used in the apex compounds. Unfortunately, resorcinol is a volatile material and is therefore desirable to remove from the workplace. Therefore, there exists a need for a resorcinol replacement without sacrificing the beneficial properties resulting from its use.

BRIEF DESCRIPTION OF THE DRAWING

The invention will be described by way of example and with reference to the accompanying drawing in which.

SUMMARY OF THE INVENTION

Figure 1:
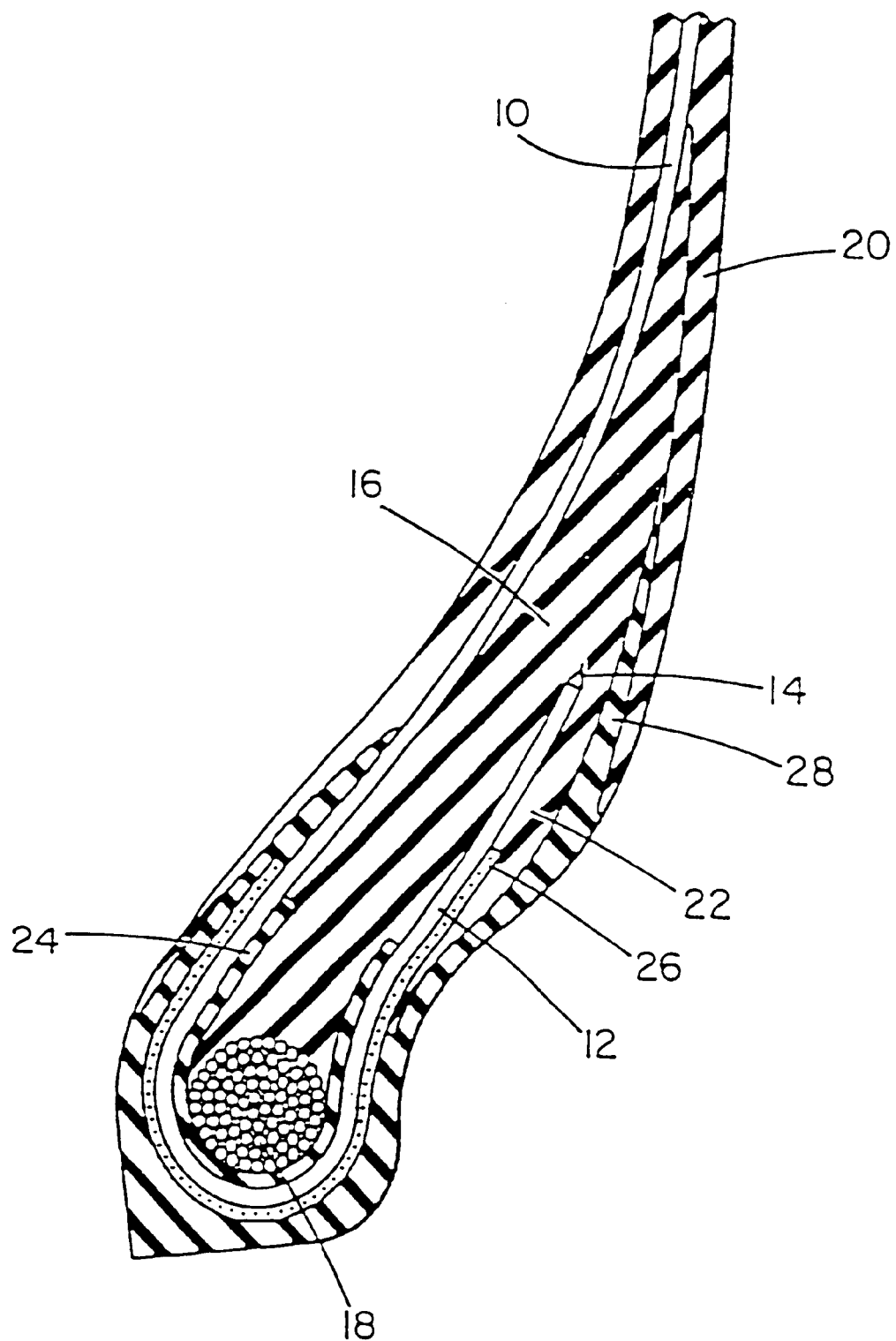
FIG. 1 is a partial cross-sectional view of a tire according to the present invention.

The present invention relates to a pneumatic tire having an apex comprised of a rubber containing 2.2 to 25 phr of the reaction product of a partially polymerized cashew nutshell oil resin and a methylene donor.

DETAILED DISCLOSURE OF THE INVENTION

There is disclosed a pneumatic tire having the apex around the carcass ply turnup comprised of (A) a sulfur-vulcanized rubber; and
(B) from 2.2 to 25 phr of the reaction product of
  (1) from 2 to 15 phr of a partially polymerized cashew nutshell oil resin; and
  (2) from 0.02 to 15 phr of a methylene donor selected from the group consisting of hexaethoxymethylmelamine, hexamethylenetetramine, hexamethoxymethylmelamine, iminomethoxymethylmelamine, iminoisobutoxymethylmelamine, lauryloxymethylpyridinium chloride, ethoxymethylpyridinium chloride, trioxan hexamethoxymethylmelamine and N-substituted oxymethyl melamines of the formula:

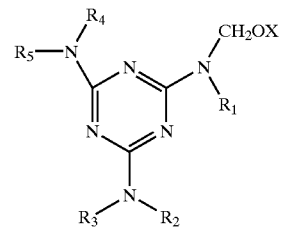

wherein X is hydrogen or an alkyl having from 1 to 8 carbon atoms, $R_1$, $R_2$, $R_3$, $R_4$ and $R_5$ are individually selected from the group consisting of hydrogen, an alkyl having from 1 to 8 carbon atoms, the group —$CH_2OX$ and their condensation products.

The present invention relates to a pneumatic tire. Pneumatic tire means a minated mechanical device of generally toroidal shape (usually an open torus) having ads and a tread and made of rubber, chemicals, fabric and steel or other materials. When mounted on the wheel of a motor vehicle, the tire through its tread provides traction and contains the fluid that sustains the vehicle load. The present invention relates to both bias and radial-ply tires. Preferably, the present invention is a radial-ply tire. Radial-ply tire means a belted or circumferentially-restricted pneumatic tire in which the carcass ply cords which extend from bead to bead are laid at cord angles between 65° and 90° with respect to the equatorial plane of the tire.

A presently preferred embodiment of this invention is shown in FIG. 1. The pneumatic tire contains a single steel cord reinforced carcass ply 10 with a turnup portion 12 and a terminal end 14. Steel cord means one or more of the reinforcement elements, formed by one or more steel filaments/wires which may or may not be twisted or otherwise formed which may further include strands so formed which strands may or may not be also so formed, of which the carcass ply in the tire is comprised. The apex 16 is in the immediate proximity of the carcass ply turnup 14 including the area above the bead 18 and is encased by the carcass ply 10 and carcass ply turnup 12 or sidewall compound 20. The apex also includes the area 22 located between the lower sidewall 20 and the axially outer side of the carcass ply turnup 12. The interface between the bead 18 and the carcass ply 10 is a flipper 24. Located outside of the carcass ply 10 and extending in an essentially parallel relationship to the carcass ply 10 is the chipper 26. Located around the outside of the bead 18 is the chafer 28 to protect the carcass ply 12 from the rim (not shown), distribute flexing above the rim, and seal the tire.

In accordance with this invention, a rubber tire is provided having an apex 16, 22 in the region of the carcass ply turnup 12 wherein said rubber in said apex 16, 22 is the above-described sulfur-cured rubber composition.

The rubber composition for use in the apex may contain a natural or synthetic diene derived rubber. Representative of the rubbers include medium vinyl polybutadiene, styrene-butadiene rubber, synthetic cis-1,4-polyisoprene, synthetic 3,4-polyisoprene, natural rubber, cis-polybutadiene, styrene-isoprene rubber, styrene-isoprene-butadiene rubber, acrylonitrile-butadiene rubber, carboxylated acrylonitrile-butadiene rubber and mixtures thereof. Preferably, the rubber is natural rubber, styrene-butadiene rubber or cis-polybutadiene.

The apex of the tire of the present invention contains from 3 to 20 phr of the reaction product of a partially polymerized cashew nutshell oil resin and methylene donor. Preferably, from 7 to 15 phr of the reaction product is used.

A partially polymerized cashew nutshell oil resin is an essential component in the present invention. Such resins in liquid form and are commercially available from Cardolite Corporation of Neward, N.J., under the designation Cardolite™ NC-360. Cardolite™ NC-360 is commercially sold as a liquid binder for friction material and liquid reactive softener or tackifier for rubber. Cardolite™ NC-360 has a viscosity ranging from 32,000 centipoise to 42,000 centipoise at 25° C. The resin is present in an amount ranging from about 2 to 15 phr. Preferably, the resin is present in an amount ranging from about 4 to 10 phr. The partially polymerized nutshell oil resin is derived from copolymerization of cardol and anacardol. The polymerization reaction may be conducted in the presence of an acid catalyst. Examples of acid catalysts include oxalic acid, hydrochloric acid, sulfuric acid and p-toluenesulfonic acid. After the catalytic polymerization reaction, the liquid resin is isolated.

In-situ resins are formed in the rubber stock and involve the reaction of partially polymerized cashew nutshell oil resin and a methylene donor. The term "methylene donor" is intended to mean a compound capable of reacting with the partially polymerized cashew nutshell oil resin and generate the resin in-situ. Examples of methylene donors which are suitable for use in the present invention include hexamethylenetetramine, hexamethoxymethylmelamine, hexaethoxymethylmelamine, iminomethoxymethylmelamine, iminoisobutoxymethylmelamine, lauryloxymethylpyridinium chloride, ethoxymethylpyridinium chloride trioxan and hexamethoxymethylmelamine. In addition, the methylene donors may be N-substituted oxymethylmelamines, of the general formula:

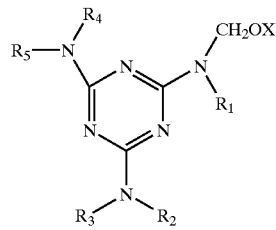

wherein X is hydrogen or an alkyl having from 1 to 8 carbon atoms, $R_1$, $R_2$, $R_3$, $R_4$ and $R_5$ are individually selected from the group consisting of hydrogen, an alkyl having from 1 to 8 carbon atoms, the group —CH2OX or their condensation products. Specific methylene donors include hexakis-(methoxymethyl)melamine, N,N',N''-trimethyl/N,N',N''-trimethylolmelamine, hexamethylolmelamine, N,N',N''-dimethylolmelamine, N-methylolmelamine, N,N'-dimethylolmelamine, N,N',N''-tris(methoxymethyl) melamine and N,N'N''-tributyl-N,N',N''-trimethylolmelamine. The N-methylol derivatives of melamine are prepared by known methods.

The amount of methylene donor that is present in the rubber stock may vary. Typically, the amount of methylene donor that is present will range from about 0.02 phr to 15 phr. Preferably, the amount of methylene donor ranges from about 0.1 phr to 4 phr.

The weight ratio of the partially polymerized cashew nutshell oil resin to methylene donor may vary. Generally speaking, the weight ratio ranges from about 0.5:1 to 25:1. Preferably, the range is from 2:1 to 20:1.

It is readily understood by those having skill in the art that the rubber compositions used in the apex area would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The apex rubber compound may contain various conventional rubber additives. Typical additions of carbon black comprise about 20 to 200 parts by weight of diene rubber (phr), preferably 50 to 100 phr.

A number of commercially available carbon blacks may be used. Included in the list of carbon blacks are those known under the ASTM designations N299, S315, N326, N330, M332, N339, N343, N347, N351, N358, N375, N539, N550 and N582. Such processing aids may be present and can include, for example, aromatic, naphthenic, and/or paraffinic processing oils. Typical amounts of tackifying resins, such as phenolic tackifiers, range from 1 to 3 phr. Silica, if used, may be used in an amount of about 5 to about 25 phr, often with a silica coupling agent. Representative silicas may be, for example, hydrated amorphous silicas. Typical amounts of antioxidants comprise about 1 to about 5 phr. Representative antioxidants may be, for example, diphenyl-p-phenylenediamine, polymerized 1,2-dihydro-2,2,4-trimethylquinoline and others, such as, for example, those disclosed in the *Vanderbilt Rubber Handbook* (1990), Pages 343 through 362. Typical amounts of antiozonants comprise about 1 to about 5 phr. Representative antiozonants may be, for example, those disclosed in the *Vanderbilt Rubber Handbook* (1990), Pages 363 through 367. Typical amounts of fatty acids, if used, which can include stearic acid comprise about 0.5 to about 3 phr. Typical amounts of zinc oxide comprise about 2 to about 10 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. The presence and relative amounts of the above additives are considered to be not an aspect of the present invention which is more primarily directed to the utilization of the combination of the reaction product of the partially polymerized cashew nutshell oil resin and methylene donor.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 5 phr, or even, in some circumstances, up to about 8 phr, with a range of from about 1.4 to about 4.0 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.5 phr. In another embodiment, combinations of two or more accelerators which is generally used in the larger amount (0.5 to 2.0 phr), and a secondary accelerator which is generally used in smaller amounts (0.05 to 0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The tire can be built, shaped, molded and cured by various methods which will be readily apparent to those having skill in such art.

The prepared tire of this invention is conventionally shaped and cured by methods known to those having skill in such art.

The invention may be better understood by reference to the following examples in which the parts and percentages are by weight unless otherwise indicated.

EXAMPLE 1

Rubber compositions containing the materials set out in Table 1 were prepared in a BR Banbury® using multiple nonproductive stages and a single productive stage of addition. Table 2 sets out the cure behavior and vulcanizate properties for the Control samples 1 through 4 and also Samples 5 through 10 which contain a partially polymerized cashew nutshell oil resin and a methylene donor. In this example, hexamethylenetetramine (HMTA) was used as the methylene donor.

As can be seen in Table 2, the partially polymerized cashew nutshell oil resin is fully cured with the HMTA without a marching modulus as evident by T90 values less than 20 minutes and time to maximum torque (Max S) less than 60 minutes.

TABLE 1

| Non-Productive | |
| --- | --- |
| Polybutadiene | 10 |
| Natural rubber | 90 |
| Carbon black | 90 |
| Processing oil | 7.25 |
| Phenol/formaldehyde resin | 2 |
| Fatty acid | 1 |
| Zinc oxide | 3 |
| PPCNO[1] | Varied |
| Productive | |
| Retarder | .3 |
| Accelerator | 1.6 |
| Zinc oxide | 2 |
| Sulfur | 5 |
| Hexamethylenetetramine | Varied |

[1]Partially polymerized cashew nutshell oil which is commercially available from Cardolite Corporation as Cardolite ™ NC-360

TABLE 2

| Sample No. | Control 1 | Control 2 | Control 3 | Control 4 | 5 |
| --- | --- | --- | --- | --- | --- |
| HMTA[1] | 0 | 0 | 0 | 0 | 0.10 |
| PPCNO[2] | 0 | 2 | 4 | 6 | 2 |
| Ratio PPCNO/HMTA | 0 | 0 | 0 | 0 | 20/1 |
| Ultimate Tensile Strength | | | | | |
| Tensile strength (MPa) | 21.3 | 21.13 | 20.65 | 19.87 | 20 |
| Elongation at break (%) | 260.9 | 295.3 | 320.6 | 335.6 | 276.7 |
| 50% modulus (MPa) | 3.63 | 3.58 | 3.45 | 3.44 | 3.56 |
| 100% modulus (MPa) | 7.5 | 7.14 | 6.63 | 6.22 | 7.09 |
| 150% modulus (MPa) | 12.43 | 11.47 | 10.4 | 9.51 | 11.2 |
| Shore D 23° C. | NA | 31 | 31 | 31 | 30 |
| Rebound 23° C. | 40.2 | 38.2 | 36.6 | 35.4 | 37.4 |
| Strebler Adhesion to Self 95° C. (N) | 27.4 | 51.7 | 33.8 | 49.9 | 27.5 |
| MDR at 150° C. | | | | | |
| TS1 | 2.84 | 3.41 | 3.27 | 3.34 | 3.24 |
| T25 (min) | 8.76 | 8.2 | 7.77 | 7.12 | 8.26 |
| T90 (min) | 16.28 | 16.04 | 15.86 | 15.41 | 16.25 |
| Delta S | 31.86 | 32.6 | 32.79 | 31.68 | 33.29 |
| Time to Max S (min.) | 24 | 26.2 | 26.2 | 26.2 | 25 |

TABLE 2A

| Sample No. | 6 | 7 | 8 | 9 | 10 |
| --- | --- | --- | --- | --- | --- |
| HMTA[1] | 0.2 | 0.3 | 0.4 | 0.3 | 0.9 |
| PPCNO[2] | 2 | 2 | 4 | 6 | 6 |
| Ratio PPCNO/HMTA | 10/1 | 6.6/1 | 10/1 | 20/1 | 6.6/1 |
| Ultimate Tensile Strength | | | | | |
| Tensile strength (MPa) | 19.1 | 18.6 | 19.13 | 18 | 18 |
| Elongation at break (%) | 219.5 | 199.32 | 199.62 | 201.3 | 191.3 |
| 50% modulus (MPa) | 4.16 | 4.49 | 5 | 4.94 | 5.26 |
| 100% modulus (MPa) | 8.26 | 8.98 | 9.76 | 9.27 | 9.8 |
| 150% modulus (MPa) | 13.31 | 14.19 | 14.9 | 14 | 14.65 |
| Shore D 23° C. | 33 | 35 | 34 | 36 | 35 |
| Rebound 23° C. | 39 | 39.8 | 39.8 | 39.8 | 39.6 |
| Strebler Adhesion to Self 95° C. (N) | 25.5 | 59.4 | 90.8 | 85.9 | 84.2 |
| MDR at 150° C. | | | | | |
| TS1 | 2.72 | 2.64 | 2.39 | 2.58 | 1.74 |
| T25 (min) | 7.29 | 6.96 | 6.09 | 6.01 | 4.49 |
| T90 (min) | 16.18 | 15.95 | 15.23 | 15.31 | 13.35 |
| Delta S | 39.33 | 40.16 | 44.31 | 46.12 | 46.18 |
| Time to Max S (min.) | 27 | 27 | 27.5 | 28 | 28 |

[1]Hexamethylenetetramine
[2]Partially polymerized cashew nutshell oil resin which is commercially available from Cardolite Corporation under the designation Cardolite ™ NC-360.

The 150 percent modulus values provided above demonstrate the advantages of the present invention. Ideally, one desires a high 150 percent. Comparing Control Sample 2 with Sample 6, one sees an increase in the 150 percent modulus (11.47 to 13.3 1) with the use of 0.2 phr methylene donor and partially polymerized cashew nutshell oil resin (PPCNO) versus PPCNO along. Similarly, when Control Sample 4 is compared with Sample 9, an increase in the 150 percent modulus (9.51 to 14) was observed.

EXAMPLE 2

Rubber compositions containing the materials set out in Table 3 were prepared in a BR Banbury® using multiple nonproductive stages and a productive stage of addition. Table 4 sets out the cure behavior and vulcanizate properties for the Control Samples 1 through 4 and also Samples 5 through 9 which contain a partially polymerized cashew nutshell oil resin and a methylene donor. In this example, hexamethoxymethylmelamine (HMMM) was used as the methylene donor.

TABLE 3

| Non-Productive | |
| --- | --- |
| Polybutadiene | 10 |
| Natural rubber | 90 |
| Carbon black | 90 |
| Processing oil | 7.25 |
| Phenol/formaldehyde resin | 2 |
| Fatty acid | 1 |
| Zinc oxide | 3 |
| PPCNO[1] | Varied |
| Productive | |
| Retarder | .3 |
| Accelerator | 1.6 |
| Zinc oxide | 2 |
| Sulfur | 5 |
| Hexamethoxymethylmelamine | Varied |

[1]Partially polymerized cashew nutshell oil which is commercially available from Cardolite Corporation as Cardolite ™ NC-360

TABLE 4

| Sample No. | Control 1 | Control 2 | Control 3 | Control 4 | 5 |
| --- | --- | --- | --- | --- | --- |
| HMMM (phr)[1] | 0 | 0 | 0 | 0 | 0.72 |
| PPCNO[2] | 0 | 2 | 4 | 6 | 2 |
| Ratio PPCNO/HMMM | 0 | 0 | 0 | 0 | 2.7/1 |
| Ultimate Tensile Strength | | | | | |
| Tensile strength (MPa) | 21.3 | 21.13 | 20.65 | 19.87 | 18.49 |
| Elongation at break (%) | 260.9 | 295.3 | 320.6 | 335.6 | 238.2 |
| 50 modulus (MPa) | 3.63 | 3.58 | 3.45 | 3.44 | 3.78 |
| 100% modulus (MPa) | 7.5 | 7.14 | 6.63 | 6.22 | 7.43 |
| 150% modulus (MPa) | 12.43 | 11.47 | 10.4 | 9.51 | 11.2 |
| Shore D 23° C. | NA | 31 | 31 | 31 | 30 |
| Rebound 23° C. | 40.2 | 38.2 | 36.6 | 35.4 | 38.6 |
| Strebler Adhesion to Self 95° C. (N) | 27.4 | 51.7 | 33.8 | 49.9 | 25.8 |
| MDR at 150° C. | | | | | |
| TS1 | 2.84 | 3.41 | 3.27 | 3.34 | 2.46 |
| T25 (min) | 8.76 | 8.2 | 7.77 | 7.12 | 8.41 |
| T90 (min) | 16.28 | 16.04 | 15.86 | 15.41 | 17.46 |
| Delta S | 31.86 | 32.6 | 32.79 | 31.68 | 35.8 |

TABLE 4A

| Sample No. | 6 | 7 | 8 | 9 |
| --- | --- | --- | --- | --- |
| HMMM (phr)[1] | 2.16 | 2.88 | 2.16 | 6.48 |
| PPCNO[2] | 2 | 4 | 6 | 6 |
| Ratio PPCNO/HMMM | .92/1 | 1.4/1 | 2.8/1 | .92/1 |
| Ultimate Tensile Strength | | | | |
| Tensile strength (MPa) | 19.37 | 19.05 | 17.67 | 17.56 |
| Elongation at break (%) | 276.6 | 288.1 | 262.4 | 353.2 |
| 50% modulus (MPa) | 3.57 | 3.69 | 3.98 | 3.36 |
| 100% modulus (MPa) | 6.73 | 6.6 | 6.87 | 5.25 |
| 150% modulus (MPa) | 10.7 | 10.24 | 10.4 | 7.75 |
| Shore D 23° C. | 33 | 33 | 33 | 32 |
| Rebound 23° C. | 37.2 | 37.2 | 37.6 | 34.8 |
| Strebler Adhesion to Self 95° C. (N) | 20.3 | 24.8 | 45.6 | 18.4 |
| MDR at 150° C. | | | | |
| TS1 | 1.83 | 1.59 | 1.7 | 1.16 |
| T25 (min) | 9.1 | 8.97 | 7.93 | 10.14 |
| T90 (min) | 21.46 | 24.85 | 21.63 | 37.53 |
| Delta S | 38.4 | 42.46 | 42.69 | 48.78 |

[1]Parts by weight per 100 parts by weight of rubber hexamethoxymethylmelamine
[2]Partially polymerized cashew nutshell oil resin which is commercially available from Cardolite Corporation under the designation Cardolite ™ NC-360.

As can be seen by comparing the controls with the present invention, Control Sample 2 versus Sample 5, Control Sample 3 versus Sample 7, and Control Sample 4 versus Sample 8, use of the combination of a methylene donor and PPCNO results in an increase in 150 percent modulus when compared to PPCNO alone.

EXAMPLE 3

Rubber compositions containing the materials set out in Table 5 were prepared in a BR Banbury® using multiple nonproductive stages and a productive stage of addition. Table 6 sets out the cure behavior and vulcanizate properties for the Control Sample 1 and also Samples 2 through 4 which contain a partially polymerized cashew nutshell oil resin and hexamethoxymethylmelamine (HMMM), imino-methoxymethylmelamine (MMM-NH) or imino-isobutoxymethylmelamine (IBNN-NH) as a methylene donor.

TABLE 5

| Non-Productive | |
| --- | --- |
| Polybutadiene | 10 |
| Natural rubber | 90 |
| Carbon black | 90 |
| Processing oil | 3 |
| Phenol/formaldehyde resin | 2 |
| Fatty acid | 1 |
| Zinc oxide | 3 |
| PPCNO[1] | Varied |
| Productive | |
| Retarder | .3 |
| Accelerator | 1.6 |
| Zinc oxide | 2 |
| Sulfur | 5 |
| Hexamethoxymethylmelamine[2] | Varied |
| Imino-methoxymethylmelamine[3] | Varied |
| Imino-isobutoxymethylmelamine[4] | Varied |

[1]Partially polymerized cashew nutshell oil which is commercially available from Cardolite Corporation as Cardolite ™ NC-360
[2]HMMM
[3]MMM-NH
[4]IBMM-NH

TABLE 6

| | Control | | | |
| --- | --- | --- | --- | --- |
| Sample No. | 1 | 2 | 3 | 4 |
| PPCNO[1] (phr) | 0 | 6 | 6 | 6 |
| HMMM[2] (phr) | 0 | 4 | 0 | 0 |
| 1 MMM-NH[3] (phr) | 0 | 0 | 5.9 | 0 |
| IBMM-NH[4] (phr) | 0 | 0 | 0 | 4.17 |
| Ultimate Tensile Strength | | | | |
| Tensile strength (MPa) | 16.92 | 18.45 | 18.68 | 18.16 |
| Elongation at break (%) | 247.8 | 270.6 | 275.5 | 300.8 |
| 50% modulus (MPa) | 2.82 | 3.96 | 3.71 | 3.86 |

TABLE 6-continued

| Sample No. | Control 1 | 2 | 3 | 4 |
|---|---|---|---|---|
| 100% modulus (MPa) | 5.89 | 7.33 | 7 | 6.57 |
| 150% modulus (MPa) | 9.85 | 11.29 | 10.89 | 9.93 |
| Shore A | 78.67 | 90.57 | 89.57 | 91.47 |
| Shore D (6 min at 170° C.) | 25 | 37 | 34 | 38 |
| Shore D (10 min at 170° C.) | 23 | 36 | 36 | 38 |
| Rebound 23° C. | 43.6 | 40.1 | 41.3 | 40.9 |
| Rebound 100° C. | 58.6 | 46.3 | 47.9 | 45.4 |
| Strebler Adhesion to Self 95° C. (N) | 28.65 | 13.04 | 11.16 | 12.6 |
| MDR at 150° C. | | | | |
| TS1 | 3.11 | 0.87 | 0.42 | 0.44 |
| T25 (min) | 6.89 | 7.42 | 6.24 | 6.96 |
| T90 (min) | 13.47 | 32.99 | 29.96 | 25.94 |
| Delta S | 33.47 | 58.06 | 41.97 | 49.38 |
| S Max | 37.3 | 62.9 | 47.43 | 54.4 |
| Time to Max S (min) | 21* | 60 | 60 | 60 |
| MDR at 170° C. | | | | |
| TS1 | 0.68 | 0.96 | 0.75 | 0.76 |
| T25 (min) | 1.7 | 2.95 | 2.88 | 3 |
| T90 (min) | 3.39 | 8.86 | 7.28 | 7.68 |
| Delta S | 30.4 | 59.62 | 40.75 | 47.53 |
| Max S | 33.89 | 64.01 | 45.76 | 52.13 |
| Time to Max S (min) | 5* | 60 | 10** | 11** |

*Reverted
**Showed an initial reversion, then stabilized.
[1]Partially polymerized cashew nutshell oil resin which is commercially available from Cardolite Corporation under the designation Cardolite ™ NC-360.
[2]Hexamethoxymethylmelamine Comparing Control Sample 1 versus Samples 2, 3 and 4, one sees an increase in 150 percent modulus with the combination of methylene donor and PPCNO.

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire having the apex around the carcass ply turnup comprised of (A) sulfur-vulcanized rubber compound;

(B) 2.2 to 25 phr, based on 100 parts by weight of said rubber, of the reaction product of (1) from 2 to 15 phr of a partially polymerized cashew nutshell oil resin; and (2) from 0.02 to 15 phr of a methylene donor selected from the group consisting of hexamethoxymethylmelamine, iminomethoxymethylmelamine, and iminoisobutoxymethylmelamine; and (C) from 1 to 3 phr, based on 100 parts by weight of said rubber, of a phenolic/formaldehyde resin.

2. The tire of claim 1 wherein said rubber is selected from the group consisting of medium vinyl polybutadiene, styrene-butadiene rubber, synthetic cis-1,4-polyisoprene, synthetic 3,4-polyisoprene, natural rubber, cis-polybutadiene, styrene-isoprene rubber, styrene-isoprene-butadiene rubber, acrylonitrile-butadiene rubber, carboxylated acrylonitrile-butadiene rubber and mixtures thereof.

3. The tire of claim 2 wherein said rubber is selected from the group consisting of natural rubber, styrene-butadiene rubber, cis-polybutadiene rubber and mixtures thereof.

4. The tire of claim 1 wherein the weight ratio of partially polymerized cashew nutshell oil resin to methylene donor ranges from 0.5:1 to 25:1.

5. The tire of claim 4 wherein the weight ratio ranges from 5:1 to 20:1.

* * * * *